Aug. 13, 1946.  C. A. DE GIERS  2,405,689
PLURAL TRANSMISSION MEANS FOR ELECTRICAL TELEMETRIC SYSTEMS
Filed Nov. 17, 1942  5 Sheets-Sheet 1

INVENTOR.
Clarence A. de Giers
BY
John C. Kerr
ATTORNEY

INVENTOR.
Clarence A. de Giers
BY
John C. Kerr
ATTORNEY

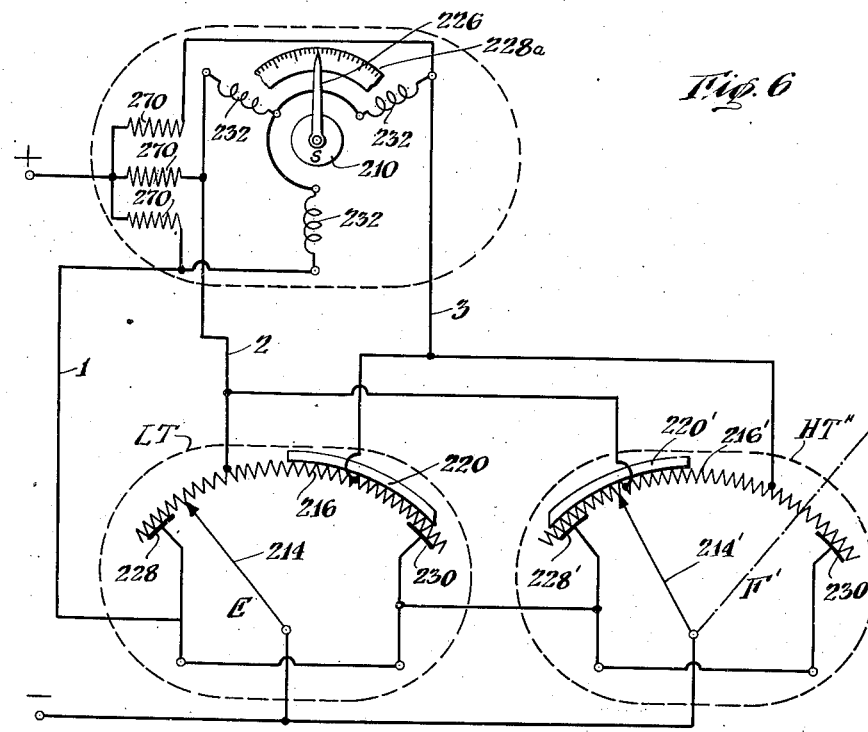
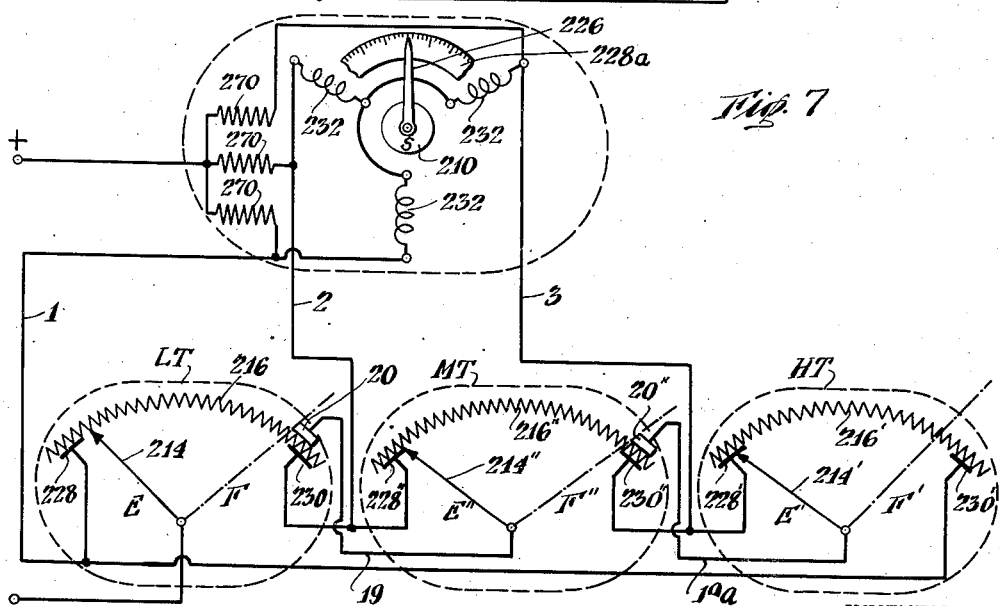

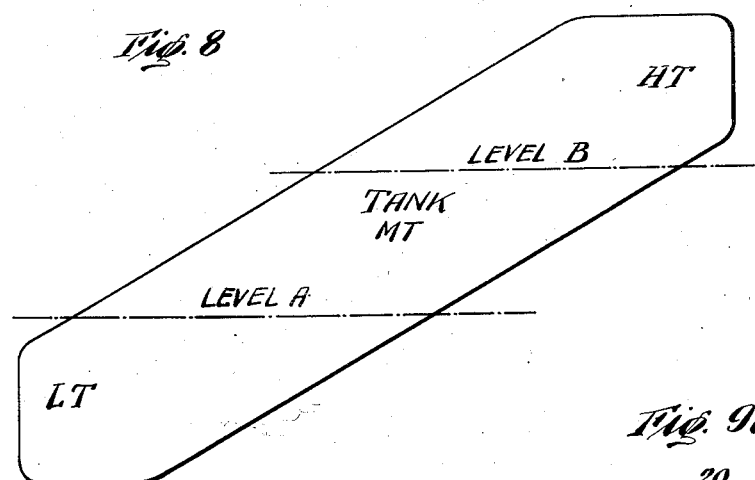
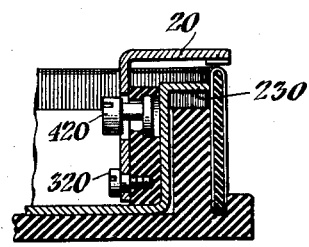
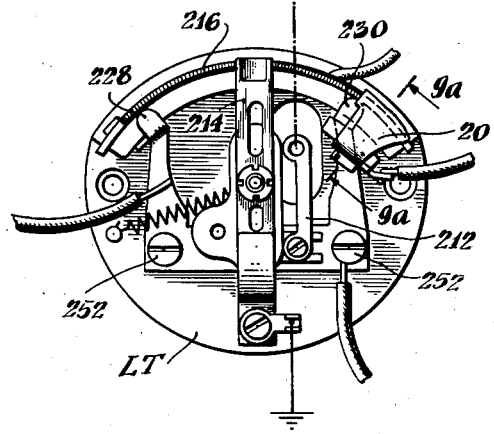
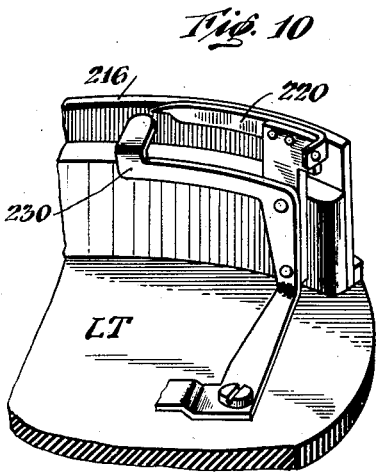

Patented Aug. 13, 1946

2,405,689

UNITED STATES PATENT OFFICE 2,405,689

PLURAL TRANSMISSION MEANS FOR ELECTRICAL TELEMETRIC SYSTEMS

Clarence A. de Giers, Forest Hills, N. Y., assignor to The Liquidometer Corporation, Long Island City, N. Y., a corporation of Delaware Application November 17, 1942, Serial No. 465,897

12 Claims. (Cl. 73—432)

This invention relates to telemetric systems and has for its objects to effect certain improvements therein so as to adapt them to more extensive use.

The invention may best be explained by considering one of its applications, i. e. to indicate liquid level.

In certain tank installations it is at times impossible to span the top and bottom of a tank with a single float due to peculiarities in the shape of the tank itself. In other cases, it may be desired to indicate on a single indicator the contents of two or more separate tanks located one above the other but pipe-connected so that the liquid of the higher tank is in communication with that in the lower tank.

Referring to the drawings which illustrate what I now consider to be preferred forms of the invention, Figure 1 is a wiring diagram illustrating a preferred form of the invention;

Fig. 6 is a view similar to Fig. 1 but illustrating a further modification.

Fig. 7 is a wiring diagram showing a form of invention in which three float-operated transmitters are employed.

Fig. 8 is a somewhat diagrammatic view showing a tank with which the invention shown in Fig. 7 may be employed.

Fig. 9 is a plan view of a transmitting instrument which may be used in certain of the forms of invention shown in the preceding figures;

Fig. 9A is a fragmentary detail on the section line 9a—9a of Fig. 9; and

Fig. 10 is a fragmentary detail view of a transmitter such as that shown in Fig. 9, but somewhat modified.

Figure 1:
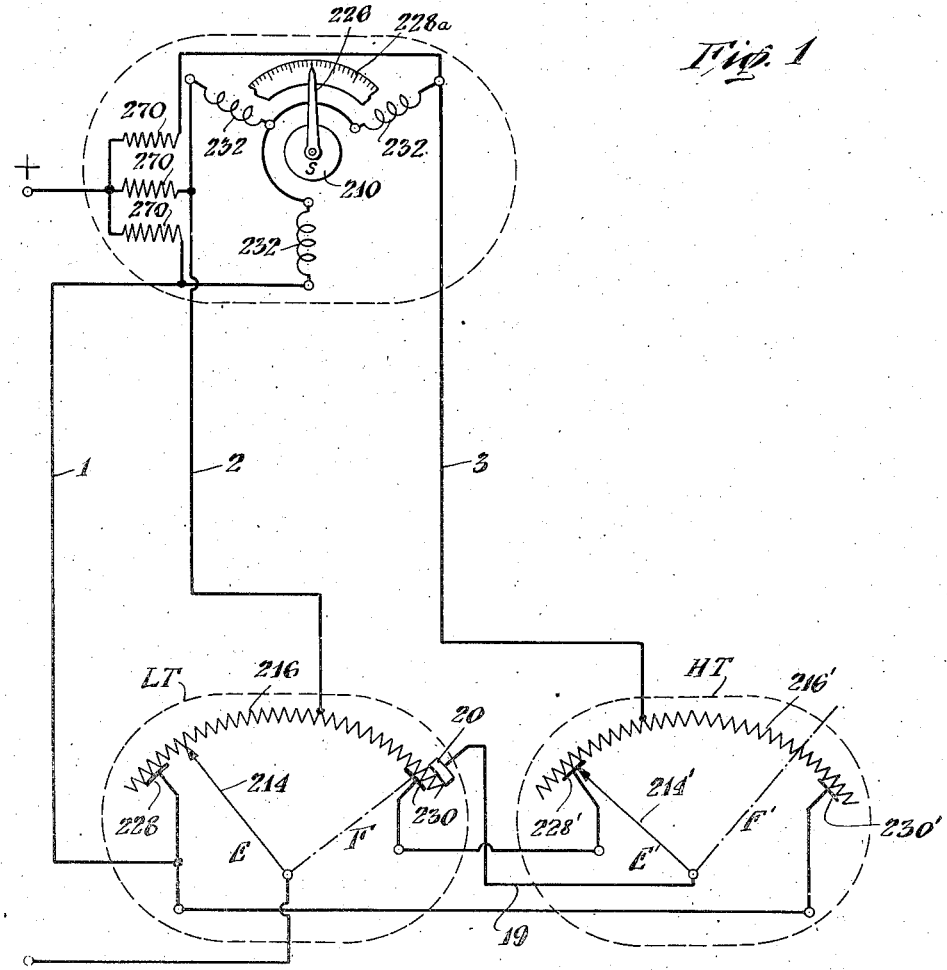

The basic or underlying system of connections shown in Fig. 1 is generally like that shown in Fig. 1 of the application for Letters Patent of the United States of Frederick J. Lingel, Serial No. 567,848, filed December 12, 1944, as a continuation of his prior application Serial No. 353,783, filed August 23, 1940, for "Electrical instruments and systems." The indicating instrument also disclosed in the cited Lingel application may be employed in the present system to advantage, although other forms of indicating instruments may be employed in the systems of the present application. Except for features hereinafter disclosed the transmitting instruments (Figs. 9 and 10) may be essentially the same as that shown in United States Patent No. 2,195,813, C. A. de Giers, patented April 2, 1940, "Rheostat adjustment."

It will be assumed that it is preferred to use, in the systems of the present invention, the indicator disclosed in the above cited Lingel application. The three resistances 270, the three coils 232 and their electrical connections correspond to the resistances 70 and the coils 32 and their electrical connections in Fig. 1 of the cited Lingel application. The rotor 210, the pointer 226 and the scale 228a correspond to the rotor 10, pointer 26 and scale 28 shown in Fig. 1 of the cited Lingel application.

Briefly, the indicator comprises the stated elements constructed and designed to operate as follows. The rotor 210 is a cylinder of magnetic material of high coercive force, such for example as Alnico, and is mounted for rotation about the axis of the cylinder. The rotor 210 is permanently poled or magnetized across a diameter thereof. The coils 232 are air core coils with their flux axes spaced at 120° and with each flux axis intersecting the axis of rotation of the rotor 210. The pointer 226 is secured to the rotor 210 or to the shaft thereof and cooperates with a stationary scale or chart 228a. Further details of the construction and operation of the indicating instrument may be obtained by reference to the cited Lingel application.

The resistance elements and the coils or windings of the indicating instrument are electrically connected as shown in the upper part of Fig. 1 and are shown electrically connected through line wires 1, 2 and 3 to the transmitting instruments shown at the bottom of Fig. 1 and one of which is shown in Fig. 9.

Referring to Fig. 9, the moving contact shoe 214, the resistance strip 216, the adjuster contact shoes 228, 230 and the adjusting screws 252, 252, correspond to the moving contact shoe 14, the resistance strip 16, the adjuster contact shoes 28, 30 and the adjusting screws 52, 52 respectively shown and described in the above cited de Giers patent and therefore need no further description. Suffice it to say that the adjuster contact shoes 228 and 230 may be adjusted with respect to the resistance strip 216, which they engage, for varying the effective range of the electrical resistance in the strip. The moving contact shoe 214 is shown diagrammatically as being float-operated through a link 212 pivotally connected to an arm projecting from the moving contact shoe 214, so that as the float rises and falls, the arm 214 moves correspondingly over the resistance 216. To provide for adjustment so that the arm or shoe 214 shall have the desired travel for the particular float, the pivotal connection between the link 212 and the projecting arm from the shoe 214 is made readily adjustable by means of a bolt extending through the forked arm so that the lever arm of the connection from the link 212 may be adjusted as to length and secured in its position of adjustment. With the exceptions hereinafter stated, each transmitting instrument may be of the construction just described.

Figure 2:
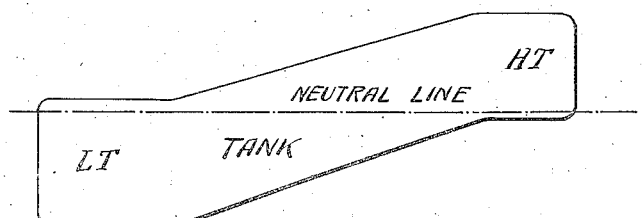
Fig. 2 is a somewhat diagrammatic view showing a tank with which the invention shown in Fig. 1 may be employed.

In Fig. 2, there is shown, in elevation, a tank of such configuration as to render it impossible to use a single vertically traveling float. Two transmitting instruments are therefore employed in this instance. The lower transmitting instrument or transmitter LT is operated by a float, having a range of travel from the bottom of the tank to the level indicated by the line "Neutral line." The other transmitter HT is located in the upper part of the tank and its float has a range of travel from the Neutral line up to the top of the tank. The electrical connections of the transmitting instruments will be apparent from the drawings (Fig. 1). The line wire 1 is connected to the adjustable contact 228 of the transmitting instrument LT and to the adjustable contact 230' of the transmitting instrument HT. The line wire 2 is connected to a tap on the resistance 216 of the transmitting instrument LT and the line wire 3 is connected to a tap on the resistance 216' of the transmitting instrument HT. The moving arm or shoe 214 of the transmitting instrument LT is shown connected to the negative side of the source of supply of electrical energy (not shown).

I provide means controlled by the transmitting instrument LT for transferring its control of the indicating instrument 210—232 to the other transmitting instrument HT when the float which operates the arm of the instrument LT is traveling upward and reaches the Neutral line. One form of such means is shown in Figs. 1, 9 and 9A as comprising an L-shaped electrical contact and cam 20 which is pivotally mounted at 320 so as to be capable of adjustment along the arc of the resistance strip 216 of the transmitter LT. This cam contact 20 may be thus adjusted by means of a slotted head 420 which may be turned to adjust an eccentric which operates in a circular opening in a stationary block of insulation and which will remain in any position of adjustment by friction. The construction of this particular adjustable member 420 and the eccentric which it operates are like the elements 52 and 48 in Fig. 6 of the above cited de Giers patent. This electrical cam contact 20 does not engage (but is insulated from) the resistance strip 216 of the transmitter LT and is mounted above it so that when the moving arm or shoe 214 of the transmitter LT reaches its limit of travel F., i. e., the position corresponding to that when its float reaches the Neutral line, the arm 214 engages the cam portion of the contact member 20 and is thereby elevated so as to disengage the arm from the resistance strip 216 of instrument LT, thereby removing the indicating instrument 210—232 from the control of the moving arm 214 of the lower transmitter LT. At the same time the control of the indicating instrument is automatically transferred to the arm 214' of the higher transmitter HT. This is effected by the electrical engagement between the arm 214 of the instrument LT with the electrically conductive cam 20, which is electrically connected by a wire 19 to the arm 214' of the higher transmitter HT, thereby connecting the arm 214' of the higher transmitter HT to the negative side of the line.

The indicator 226—228a at all times indicates the correct height or level of the liquid in the tank shown in Fig. 2. Let us assume that the tank is empty and is being filled with liquid. As the float of the lower transmitter LT rises with the liquid, the indicator is under the control of the instrument LT and its arm 214 until the liquid and the float reach the Neutral line. At this stage the moving arm 214 of the transmitter LT will have moved to position F, where it is automatically raised and disconnected from the contact strip 216 of the instrument LT, as above explained, and automatically connects the arm 214' of the higher transmitter HT to the negative side of the line through the contact 20. As the liquid continues to rise in the tank, the indicator, now under the control of the arm 214' of the higher transmitter HT, continues to indicate correctly the liquid level as the latter continues to rise in the tank. Conversely, if the tank is full and the liquid level descending the indicator is first controlled by the arm 214' of the higher transmitter HT and then when the Neutral line is reached by the descending liquid level, the control is automatically passed back to the arm 214 of the lower transmitter LT, this being effected by the movement of the arm 214 of the transmitter LT off the electrical cam 20.

Figure 3:
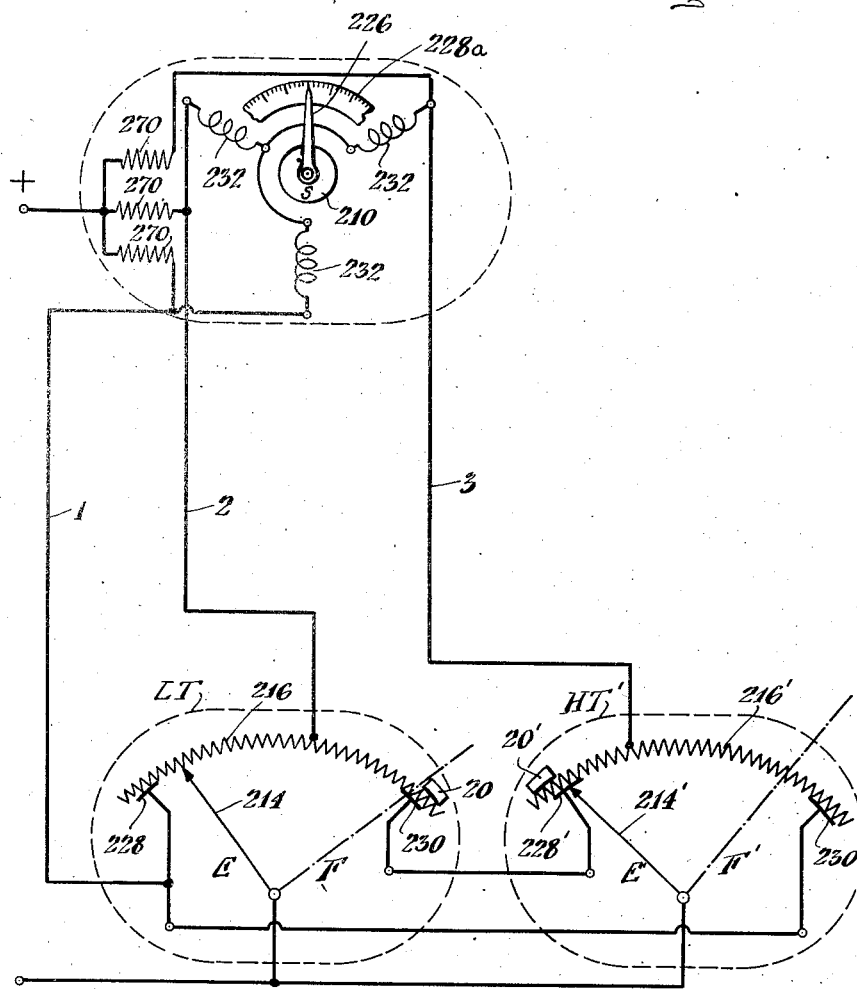
Fig. 3 is a view similar to Fig. 1 but illustrating a modification.

The form of invention shown in Fig. 3 differs from that shown in Fig. 1 in the following respects: (1) the arm 214' of the transmitter HT is permanently electrically connected to the negative side of the supply; (2) the electrical line 19 of Fig. 1 is omitted in Fig. 3, and (3) the transmitter HT' in Fig. 3 is provided with a cam 20' whereas the corresponding transmitter HT in Fig. 1 has no such cam. In Fig. 3 the cam 20' for the transmitter HT' is similar to that shown at 20 in the transmitter LT of Fig. 1, except that instead of being located at the F position, it is located (in Fig. 3) at the E' (empty) position which the arm 214' of the transmitter HT' occupies when its float is on the Neutral line. It will be understood, of course, that in both forms of invention shown in Figs. 1 and 3, the F position of the transmitter LT corresponds to the position of the float on the Neutral line and does not indicate that the tank is actually completely full. Also when the arm of the transmitter HT' is at position E (empty), this does not mean that the tank is empty but that the float of the transmitter HT' is on the Neutral line. It is true that when the tank is empty the arm 214 of the transmitter LT will be at the E position and it is also true that when the tank is full the arm 214' of the transmitter HT' will be at the full (F') position. The operation of the form of invention shown in Fig. 3 will be understood in view of the foregoing explanations supplemented by the following. Assuming that the float of the transmitter LT is rising with entering liquid, it will be noted that when its arms 214 reaches the F position, i. e. when the float is at the Neutral line (see Fig. 2), the cam 20 causes the arm 214 to be disengaged from the resistance strip 216 and at the same time the arm 214' of the higher transmitter HT' will become disengaged from its cam 20' so as to engage and make electrical contact with the resistance strip 216' of the last mentioned transmitter.

Figure 4:
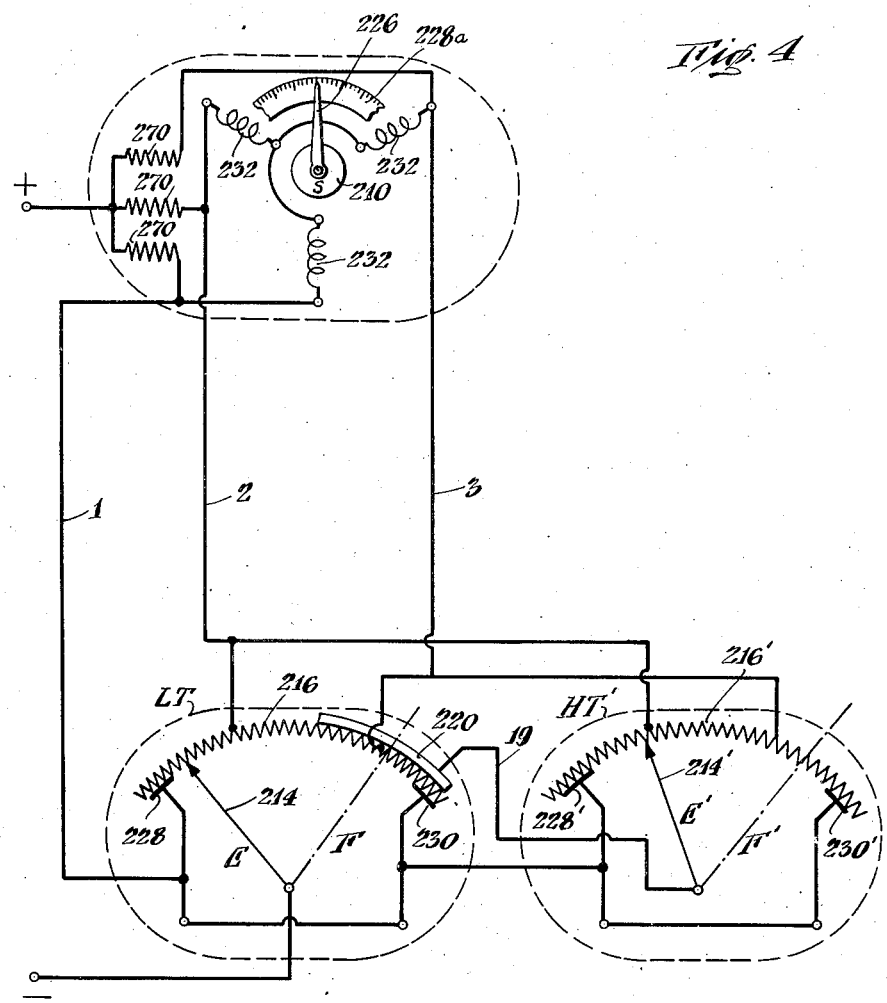
Fig. 4 is another view similar to Fig. 1 but illustrating a modification.
Figure 5:
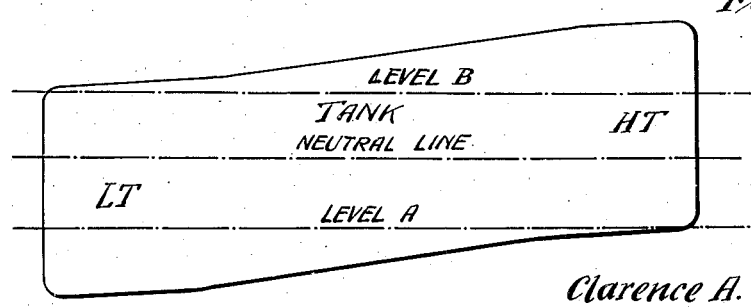
Fig. 5 is a somewhat diagrammatic view illustrating a tank with which the form of invention shown in Fig. 4 may be employed.

The form of invention shown in Figs. 4, 5 and 10 differs from that shown in Figs. 1, 2, 9 and 9A in certain respects which I shall now proceed to describe. The electrical connections at the transmitting end in Fig. 4 are such that the resistances 216—216' are used in a generally parallel arrangement, whereas the corresponding resistances 216—216 in Fig. 1 are used in a general series sense. The tank shown in elevation in Fig. 5 is of such vertical section that there is a considerable zone between the lowermost position of the float of the higher transmitter (Level A) and the uppermost position of the float of the lower transmitter LT (Level B). The neutral line may be selected anywhere in this zone. To this end, the contact cam 220 (Fig. 10) is made longer than the contact cam 20 of Figs. 1, 9 and 9A; its length and position being so selected as to cause the arm 214 of the transmitter LT to engage the cam contact 220 and to be disengaged from the contact strip 216 at the desired neutral line lying somewhere between Level A and Level B. In other words, there is a considerable tolerance or leeway with respect to the length and positioning of the cam contact 220 in the Fig. 4 and Fig. 5 arrangement. The operation of the invention shown in Figs. 4, 5 and 10 will now be obvious to those skilled in the art in view of the foregoing disclosures and explanations. The transmitter shown in Fig. 10 and at LT in Fig. 4 is the same as that shown in Fig. 9, except that the contact 220 is differently mounted and constructed from the contact 20 previously described, this difference being shown in Fig. 10.

The form of invention shown in Fig. 6 is like that in Fig. 4, with the following exceptions: The contact cams 220 and 220' are used merely as cams in Fig. 6, whereas the cam 220 is used both as a cam and an electrical contact in Fig. 4. In Fig. 6 both of the arms 214 and 214' are permanently electrically connected to the negative side of the supply, whereas in Fig. 4 only the arm 214 of the transmitter LT is permanently connected to the negative side of the supply. In Fig. 6 the line wire connection 19 of Fig. 4 is omitted. In Fig. 6 the transmitter HT" is provided with a cam 220' similar to the cam 220 of the transmitter LT except for its location, i. e. the cam 220' of the transmitter HT" is placed at the left hand end of the resistance strip 216', instead of at the right hand end of the resistance strip 216.

In Fig. 6 the cams 220, 220' are so positioned that when the liquid is rising in the tank (see Fig. 5) and the arm 214 of the transmitter LT reaches the selected neutral line, it is raised by the cam 220 from the resistance strip 216 and simultaneously the arm 214' of the transmitter HT" rides off its cam 220' and electrically engages the contact strip 216' of the last mentioned instrument. The operation of this form of the invention will now be apparent to those skilled in the art in view of the foregoing descriptions and explanations.

In Fig. 7 there is shown a form of the invention which may be employed with a tank such as that shown in elevation in Fig. 8. Here the tank is of such configuration that when the float of the lower transmitter LT reaches its uppermost position, the liquid in the tank is at a level below that at which the float of the higher transmitter HT may assume control. There is, therefore, provided a third transmitter MT. The electrical connections in Fig. 7 are essentially the same in principle as those shown in Fig. 1. The line wire 2 is, however, connected to the adjustable contact shoe 230 of the transmitter LT and to the adjustable contact shoe 228" of the transmitter MT, instead of being connected to an intermediate tap on the resistance 216 of the transmitter LT as shown in Fig. 1. Similarly, the line wire 3 is connected to the adjustable contact shoe 230" of the transmitter MT and to the adjustable contact shoe 228' of the transmitter HT. The transmitter MT is provided with a contact cam 20" similar to that shown at 20 in the transmitter LT and described above in connection with Figs. 1, 9 and 9A. The operation of this form of the invention is as follows.

Assume that the tank was empty and is being filled. The transmitter LT controls the indicator and causes the latter to indicate the level of the rising liquid accurately until the float of the transmitter LT reaches Level A. At this time the arm 214 of the transmitter LT is raised by the cam 20 of that transmitter and thereby disconnected from the resistance strip 216 of that transmitter. This establishes a circuit from the negative side of the supply through the arm 214 of the transmitter LT, through the contact 20 of that same transmitter, through the electrical connection 19 to the arm 214" of the transmitter MT. As the liquid continues to rise the transmitter MT controls the indicator so as to indicate accurately the liquid level between Level A and Level B. When the liquid level reaches Level B the arm 214" of the transmitter MT engages the cam 20" of that transmitter and is disconnected from the resistance strip 216" thereof. Simultaneously the arm 214' of the transmitter HT is connected to the negative side of supply through the arm 214 of the transmitter LT, the contact 20 of that same transmitter, the connection 19, the arm 214" of the transmitter MT, the contact 20" of the transmitter MT, the line 19a to the arm 214' of the transmitter HT. The transmitter HT now assumes control and causes the indicator accurately to show the liquid level between Level B and the top of the tank.

While I have herein shown an indicating instrument of the kind disclosed in the cited Lingel application and so connected that a full scale reading of 360° may be obtained, my invention is not limited to the use of that particular indicator. Other indicators with a different number of coils and with lesser extent as to the scale employed, may be satisfactorily used in systems embodying my invention in certain cases. Furthermore, the details of the transmitting instruments may be considerably varied without departure from the automatic transfer of the control of the indicating instrument from one transmitter to another.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted, and some of the features of each modification may be embodied in the others, without interfering with the more general results outlined, and the invention extends to such use within the scope of the appended claims.

What I claim is:

1. In combination, an electrical indicating instrument, a plurality of transmitting instruments and electrical connections for successively controlling said indicating instrument by said transmitting instruments, at least one of said transmitting instruments including a resistance and a movable contact therefor, and means controlled by at least one of said transmitting instruments for transferring its control of the indicating instrument to another of said transmitting instruments, said last mentioned means including a device for disengaging said movable contact from said resistance and for simultaneously electrically connecting it to another of said transmitting instruments.

2. In a device of the class described in combination, a resistance strip, a contact shoe movable in a certain plane along said strip under control of a prime mover, adjustor shoes in electrical contact with said strip at each end thereof and movable with respect thereto in a plane preventing contact with the contact shoe during movement of the contact shoe along the resistance strip, means for manually adjusting said adjustor shoes on said strip for varying the effective range of electrical resistance in said strip in accordance with the movement of said prime mover, and a cam device for disengaging said movable contact shoe from the resistance strip at a predetermined point in the travel of said movable contact shoe.

3. In a device of the class described in combination, a resistance strip, a contact shoe movable in a certain plane along said strip under control of a prime mover, adjustor shoes in electrical contact with said strip at each end thereof and movable with respect thereto in a plane preventing contact with the contact shoe during movement of the contact shoe along the resistance strip, means for manually adjusting said adjustor shoes on said strip for varying the effective range of electrical resistance in said strip in accordance with the movement of said prime mover, and a cam device for disengaging said movable contact shoe from the resistance strip at a predetermined point in the travel of said movable contact shoe, the said cam device being electrically conductive but normally insulated from the resistance strip and together with said movable contact shoe constituting a switch.

4. In combination, an electrical indicating instrument, a plurality of float-controlled transmitting instruments and electrical connections including an E. M. F. supply line for successively controlling said indicating instrument by said transmitting instruments, and float-controlled means for transferring the control of the indicating instrument from one of said transmitting instruments to another of said transmitting instruments, each of said transmitting instruments having a movable control arm and said last mentioned means including a cam contact adjustable along the path of travel of at least one of said arms for electrically connecting and disconnecting an arm of another of said transmitters to one side of said supply line.

5. In combination, an electrical indicating instrument, a plurality of successively arranged transmitting instruments, and electrical connections for successively controlling said indicating instrument by said transmitting instruments, an external source of E. M. F., one side of which is connected to said indicating instrument, each of said transmitting instruments including a resistance and a movable contact cooperating therewith, and means controlled by at least one of said transmitting instruments for transferring its control of said indicating instrument to the next successively arranged transmitting instrument, the last named means including connections between the end portion of the resistance of each transmitting instrument and the beginning portion of the resistance of the next successively arranged transmitting instrument, a connection from the other side of said source of E. M. F. to the movable contact of the first of said transmitting instruments, cam means associated with, but electrically insulated from, the end portion of the resistance of at least said first transmitting instrument for moving the movable contact of that instrument out of electrical contact with the resistance of such instrument, and a connection effective at least when the movable contact of said first transmitting instrument is out of electrical contact with its associated resistance for connecting the movable contact of the next successively arranged transmitting instrument to said other side of said source of E. M. F., the aforesaid parts being so constructed and arranged that upon the movable contact of the first transmitting instrument riding up onto the associated cam means, this instrument ceases to control said indicating instrument and control is effected solely by the next successively arranged transmitting instrument.

6. In combination, an electrical indicating instrument, a plurality of successively arranged transmitting instruments, and electrical connections for successively controlling said indicating instrument by said transmitting instruments, an external source of E. M. F., one side of which is connected to said indicating instrument, each of said transmitting instruments including a resistance and a movable contact cooperating therewith, and means controlled by at least one of said transmitting instruments for transferring its control of said indicating instrument to the next successively arranged transmitting instrument, the last named means including connections between the end portion of the resistance of each transmitting instrument and the beginning portion of the resistance of the next successively arranged transmitting instrument, a connection from the other side of said source of E. M. F. to the movable contact of the first of said transmitting instruments, cam means associated with, but electrically insulated from, the end portion of the resistance of at least said first transmitting instrument for moving the movable contact of that instrument out of electrical contact with the resistance of such instrument, means for adjusting the position of said cam means along the path of movement of the associated movable contact, and a connection effective at least when the movable contact of said first transmitting instrument is out of electrical contact with its associated resistance for connecting the movable contact of the next successively arranged transmitting instrument to said other side of said source of E. M. F., the aforesaid parts being so constructed and arranged that upon the movable contact of the first transmitting instrument riding up onto the associated cam means, this instrument ceases to control said indicating instrument and control is effected solely by the next successively arranged transmitting instrument.

7. In combination, an electrical indicating instrument, three successively arranged transmitting instruments, and electrical connections for successively controlling said indicating instrument by said transmitting instruments, an external source of E. M. F., one side of which is connected to said indicating instrument, each of said transmitting instruments including a resistance and a movable contact cooperating therewith, and means controlled by each of the first two of said transmitting instruments for transferring its control respectively to the next successively arranged transmitting instrument, the last named means including a connection between the end portion of the resistance of the first and second transmitting instruments and the beginning portion of the resistance of the second and third transmitting instruments respectively, a connection from the other side of said source of E. M. F. to the movable contact of the first of said transmitting instruments, cam means associated with, but electrically insulated from, the end portions of the resistances of the first and second transmitting instruments for moving the respectively associated movable contacts out of electrical contact with the resistances of such instruments respectively, and a connection between each of said cam means and the movable contact of the next successively arranged transmitting instrument so that when one of said movable contacts has ridden up on to its associated cam means, an electrical connection will be completed from the first named movable contact through the associated cam means to the movable contact of the next successively arranged transmitting instrument.

8. In combination, an electrical indicating instrument for indicating the magnitude of a condition, two transmitting instruments arranged to control said indicating instrument throughout different contiguous portions of its range, and electrical connections for transferring control from one of said transmitting instruments to the other as the condition to be indicated moves from the range of said indicating instrument under the control of one of said transmitting instruments to that under the control of the other, an external source of E. M. F., one side of which is connected to said indicating instrument, each of said transmitting instruments including a resistance, connections between said resistances and with said indicating instrument so that said resistances are connected substantially in parallel with one another, a movable contact cooperating with the resistances of each of said transmitting instruments, and means for transferring the control from one of said transmitting instruments to the other in accordance with the condition being controlled moving from the range of one of said instruments to that of the other, the last named means including a cam extending along substantially half the length of the resistance of the first of said transmitting instruments which is electrically insulated from the associated resistance and is adapted to move the associated movable contact out of electrical contact with the associated resistance during its movement over that portion of the associated resistance along which the cam is located, a connection from the other side of said source of E. M. F. to the movable contact of the first of said transmitting instruments, and means effective at least during the time the movable contact of the first of said transmitting instruments is maintained out of contact with its associated resistance by said cam for connecting the movable contact of the other of said transmitting instruments with said other side of said source of E. M. F.

9. Apparatus in accordance with claim 8, comprising in addition, means for adjustably varying the position of said cam along the path of travel of its associated movable contact so as adjustably to predetermine the point at which it will move such associated movable contact out of electrical contact with the associated resistance.

10. In combination, an electrical indicating instrument for indicating the magnitude of a condition, a plurality of successively arranged transmitting instruments, and electrical connections for successively controlling said indicating instrument by said transmitting instruments, an external source of E. M. F., one side of which is connected to said indicating instrument, each of said transmitting instruments including a resistance and a movable contact cooperating therewith, and means controlled by each of said transmitting instruments for transferring its control to the next successively arranged transmitting instrument upon variation of the magnitude of the condition being controlled and indicated on said indicating instrument in either direction between the ends of its range of movement being indicated, the last named means including connections between the end portions of the resistance of each of said transmitting instruments and the beginning portion of the resistance of the next successively arranged transmitting instrument respectively, a connection from the other side of said source of E. M. F. to each of the movable contacts of said transmitting instruments, and cam means associated with the ends of all said resistances intermediate the beginning portion of the resistance of the first transmitting instrument and the end portion of the resistance of the last transmitting instrument, said cam means being respectively electrically insulated from their associated resistances and being adapted to cooperate with the movable contacts respectively associated therewith to move such movable contacts out of electrical contact with the associated resistances, said cam means being further constructed and arranged so that the movable contact of the first of said successively arranged transmitting instruments will be moved out of contact with its associated resistance just after the variation in the magnitude of the condition to be indicated has caused the movable contact of the next successively arranged transmitting instrument to be moved off of the associated cam means at the beginning of the associated resistance and into electrical contact with such resistance, and means including the first named electrical connections for transmitting to said indicating instrument from all said transmitting instruments a plurality of differing electrical values causing said indicating instrument to indicate variations in the magnitude of the condition to be indicated throughout its range under control successively of said transmitting instruments.

11. Apparatus in accordance with claim 10, comprising in addition, means for adjusting the position of one of said cam means along the path of movement of its associated movable contact so as to adjustably predetermine the point at which such associated movable contact moves into and out of electrical contact with the associated resistance.

12. Apparatus in accordance with claim 10, comprising in addition, means for adjustably positioning two of said cam means, one adjacent to the end portion of the resistance of one of said transmitting instruments and the other adjacent to the beginning portion of the next successively arranged transmitting instrument, so as mutually and jointly to predetermine the point of transfer of control of said indicating instrument from the first of said transmitting instruments to the second and vice versa.

CLARENCE A. DE GIERS.